United States Patent Office 3,079,120
Patented Feb. 26, 1963

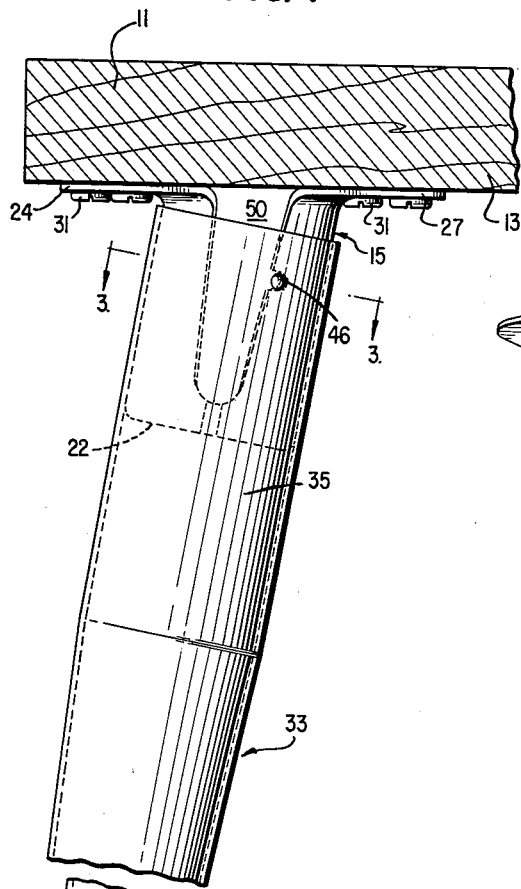
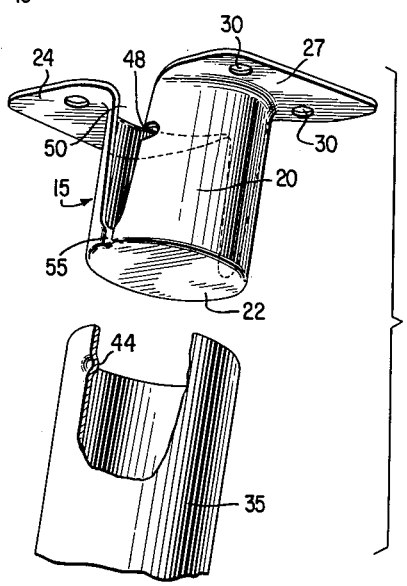
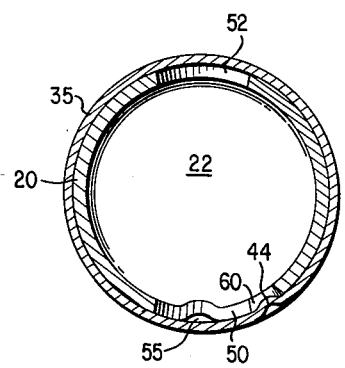
INVENTOR.
BERNARD SCHWARTZ

3,079,120
LEG ASSEMBLY
Bernard Schwartz, % Consolidated Metal Products Co.,
3125–49 Carroll Ave., Chicago 12, Ill.
Filed Nov. 3, 1961, Ser. No. 149,959
2 Claims. (Cl. 248—188)

This invention is a novel furniture leg arrangement having important advantages over arrangements known to the art. The invention provides a coupling between the body of an article of furniture, for example a table and a hollow tubular leg, which is remarkable for its simplicity, durability, aesthetic value and ease of manufacture.

Furniture having tubular legs is becoming increasingly popular because of the favorable strength-to-weight ratio of such furniture which results in manufacturing economies and ease of moving. Tubular legs also have the advantage of a wide range of materials from which they may be manufactured. Synthetic resins such as styrenes, epoxy and phenolic resins are available for making high impact resistant tubular legs by molding, etc. Such resins may be reinforced, if desired, with glass or other fibers. Tubular legs which employ this invention may also be manufactured of molded wood laminates. The lightweight metals aluminum and magnesium are readily available for tubular leg manufacture, but mostly, tubular legs for furniture are manufactured from steel. These steel legs generally have a smooth outside coating designed to prevent the corrosion of the leg and to present a more attractive appearance. Chromium and other metallic finishes as well as paint are usually applied to the legs.

Known methods for attaching tubular legs to the body of furniture frequently present a number of disadvantages. The use of female type coupling members rigidly mounted to the bottom of the body of the furniture are usually designed to engage the outside of the upper portion of the leg frictionally, perhaps with the use of a set screw. Other arrangements provide for a sheet metal female coupling which is drawn into close engagement with the upper portion of the outside of the leg by the use of bolts or other fastening means. In these situations, however, not only is the arrangement aesthetically poor, but the smooth surface of the outside of the leg makes poor frictional contact with the coupling and is prone gradually to become disengaged from the coupling due to the hard usage frequently given to tubular leg furniture.

Coupling arrangements also are known where the tubular leg is provided with a spider insert upon which a coupling member, such as a bolt, screw, or internal threaded portion is mounted. Once more such coupling arrangements, where the spider is merely wedged into the tubular leg are likely to loosen considerably with wear, especially in assembling and disassembling furniture having flared legs.

Further, it is common for tubular leg furniture to be sent to the customer in "knocked-down" condition, that is, with the legs detached. The provision of more positive coupling than frictional engagement, for example, positive mechanical interlocking is either not provided in prior art furniture leg assemblies, or, if provided, requires the use of additional fastening elements and these, of course, lead to packaging problems, and the assumptions that the customer has the proper tools and the patience to use them without becoming dissatisfied with the merchandise. These are not always valid assumptions.

The furniture leg assembly of this invention provides positive mechanical interlocking without the use of separate fasteners. The mechanical interlocking feature is supplemented by frictional engagement. No tools are required to install or remove the legs and the coupling does not mar the aesthetic value of the leg. The furniture leg assembly of this invention employs a cup-shaped coupling member rigidly fastened to the bottom of the body of the furniture. This coupling member is frictionally engaged with the inside of a tubular leg and also provides a passage for assembling and disassembling the leg as well as a slot for mechanical interlocking with the leg.

The invention will be more readily understood by reference to the accompanying drawing which shows a preferred embodiment of the invention but is not to be considered limiting. In the drawing, FIGURE 1 is a perspective view of a table leg in its assembled position showing the coupling member and a portion of the body of the furniture;

FIGURE 2 is an exploded or disassembled view of the upper part of the leg, which is partly cut away, and the coupling member; and FIGURE 3 is a cross-sectional view along the line 3—3 of FIGURE 1.

The body 11, of the article of furniture has the bottom 13 to which the coupling member 15 is attached. This coupling member comprises a cup shaped body having a generally cylindrical side 20 and the generally flat bottom 22. The coupling member has two lip portions 24 and 27 which preferably, as shown, extend outwardly from the cup-shaped member. When vertical legs are to be attached to the body of the furniture the lips are at a right angle to the axis of the cylindrical side 20. Where the leg is to be flared, as shown in the drawings, one of the lips is at an acute angle and the other lip at an obtuse angle to the axis of the cylinder. The lips are provided with suitable means, such as the holes 30, for securing the coupling to the underside of the furniture body, for example, by screws 31.

The leg 33 may be a tapered tube or a straight cylinder if desired. The taper may be uniform or not, as desired, for the proper aesthetic effect. As shown, the leg has a straight cylindrical thigh 35 and a tapered frusto-conical calf 39 which leads to the foot 41 which may be provided with a suitable member, such as a caster, not shown, for proper contact with the floor or other support. The thigh is provided on its inside surface, toward the top open end of the tubular leg, with the projection 44. This may be a member permanently fastened in this position but preferably, for ruggedness and ease of manufacture, is the inside of dimple 46 which appears on the outside of the leg.

As shown, the cylindrical surface 20, of the cup-shaped member 15, is provided with the slot 48 for reception of the projection 44 upon twisting of the leg 33. Although shown as a cut-out portion the slot 48 may be any cavity suitable for reception of the projection 44 upon horizontal motion of the projection and for securing the projection from upwards or downwards motion after such horizontal movement. Preferably this slot is a distance from the top of the cup-shaped member, when the leg is to be vertical, substantially no greater than the distance of the projection 44 from the top of the leg 33. Where the leg is flared, allowance is made for fitting at least some portion of the top of the leg 33 snugly against a lip of the coupling member. It is necessary to have a passage in the coupling member for generally vertical movement of the projection 44 along the coupling member. This passageway extends from the bottom 22 to a position horizontally displaced from the slot 48. As shown, the cylindrical surface 20 has the gaps 50 and 52. Actually, these gaps are the result of the preferred mode of manufacture of the coupling; however, these gaps provide for expansion of the coupling member due to temperature changes to allow removal of the leg under such circumstances. Also, the gap provides part of the passageway for projection 44. As shown, the passageway is completed by the depressed channel 55 provided in the side 20 of the coupling 15. This channel extends from the bottom 22 of the cup to the gap 50, if such gap is present. Otherwise this channel 55 may form the complete passage for vertical movement of the projection 44 from the bottom 22 of the cup to a position generally horizontally displaced from the notch 48.

The coupling is easily manufactured by hot pressing from a single sheet of material. Preferably this material is the same as the material from which the leg is made, or at least has the same coefficient of expansion as the leg material, to prevent excess loosening or tightening of the leg due to temperature changes. Also, the cup-shaped member has the same outer configuration as the inner configuration of the thigh 35, being straight cylindrical when the thigh is of that shape or being frusto-conical with the same rate of convergence when the thigh is tapered. Ideally the gaps 50 and 52 do not extend all the way to the bottom 22 but rather the cylindrical surface 20 is continuous, except for the channel 55, in the vicinity of bottom, 22. This continuity, along with the provision of a bottom 22 for the cup, provides for greater dimensional stability in the coupling member.

The surface 20 contacts the inside of thigh 35 in a light frictional engagement. This light frictional engagement along with the mechanical interlocking of projection 44 and slot 48 provide for ease of assembly and disassembly of the furniture, while preventing accidental rotation and loosening of the leg.

The assembly and disassembly techniques employed are obvious and simple in the extreme, assembly comprising merely inserting the member 15 in the open upper end of the thigh 35, the projection 44 being aligned with the channel 55. The leg is pushed up on the coupling and when the projection 44 is horizontally aligned with the slot 48, the leg is twisted to provide mechanical interlocking. Disassembly uses the opposite procedure.

It can thus be seen that this invention provides a furniture leg assembly which may be easily manufactured and readily put together or taken apart without tools. The assembly provides both frictional and mechanical security against leg loosening.

It is claimed:

1. A furniture leg assembly comprising a tubular leg and a coupling, said leg having closed substantially cylindrical internal and external surfaces, an open upper end and an inward projection, said coupling having means for being fixed to the bottom of the body of the furniture, and a cup-shaped member with a bottom and a cylindrical side, the outer surface of said side having a passage for vertical movement of said projection and a slot extending horizontally from said passage to prevent vertical movement of said projection, said outer surface being of a size suitable for light frictional engagement with the inner surface of said leg.

2. The assembly of claim 1 in which the passage for vertical movement comprises a channel and a gap in said side.

References Cited in the file of this patent
UNITED STATES PATENTS

| | | |
|---|---|---|
| 952,090 | Zdzieblowski | Mar. 15, 1910 |
| 1,408,284 | Galloway | Feb. 28, 1922 |

FOREIGN PATENTS

| | | |
|---|---|---|
| 736,371 | France | Nov. 3, 1932 |
| 641,776 | Germany | Feb. 4, 1937 |